United States Patent
Soma' et al.

(10) Patent No.: US 9,228,887 B2
(45) Date of Patent: Jan. 5, 2016

(54) DEVICE FOR DIAGNOSING RAILWAY BOGIES BY APPLYING AN ENERGY-AUTONOMOUS MEASURING AND TRANSMITTING BOLT, AND CORRESPONDING CONTROL METHOD

(75) Inventors: Aurelio Soma', Savigliano (IT); Giorgio De Pasquale, Occhieppo Inferiore (IT)

(73) Assignee: POLITECNICO DI TORINO, I-Torino (IT)

( * ) Notice: Subject to any disclaimer, the term of this patent is extended or adjusted under 35 U.S.C. 154(b) by 559 days.

(21) Appl. No.: 13/636,314

(22) PCT Filed: Mar. 23, 2011

(86) PCT No.: PCT/IB2011/000624
§ 371 (c)(1),
(2), (4) Date: Jan. 8, 2013

(87) PCT Pub. No.: WO2011/117718
PCT Pub. Date: Sep. 29, 2011

(65) Prior Publication Data
US 2014/0000373 A1    Jan. 2, 2014

(30) Foreign Application Priority Data
Mar. 23, 2010 (IT) .............. TO2010A0226

(51) Int. Cl.
*G01H 1/00* (2006.01)
*G01M 7/00* (2006.01)
(Continued)

(52) U.S. Cl.
CPC . *G01H 1/00* (2013.01); *G01M 7/00* (2013.01); *G01M 13/045* (2013.01); *G01M 17/10* (2013.01)

(58) Field of Classification Search
CPC .................................................. G01H 1/00
USPC ............................................. 73/658
See application file for complete search history.

(56) References Cited

U.S. PATENT DOCUMENTS

| | | |
|---|---|---|
| 4,200,855 A | 4/1980 | Gilcher |
| 4,812,826 A | 3/1989 | Kaufman et al. |
| 6,161,962 A | 12/2000 | French et al. |

(Continued)

FOREIGN PATENT DOCUMENTS

| | | |
|---|---|---|
| CN | 1230245 | 9/1999 |
| CN | 101229762 | 7/2008 |

(Continued)

OTHER PUBLICATIONS

English Translation of Official Action for China Patent Application No. 201180020558.0, dated Jul. 3, 2014, 13 pages.

(Continued)

*Primary Examiner* — Hezron E Williams
*Assistant Examiner* — Mark A Shabman
(74) *Attorney, Agent, or Firm* — Sheridan Ross P.C.

(57) ABSTRACT

A measuring and transmitting bolt or threaded element for a railway bogie comprises a head defined in which is a seat, and a threaded stem defined in which is a hole, a miniaturized vibration sensor, a transmitter, a battery for supplying said MEMS vibration sensor and said transmitter, and a miniaturized converter for converting into electrical energy the mechanical energy from the vibrations in order to recharge the battery. In particular, the transmitter and the vibration sensor are housed in the seat, and the miniaturized converter and the battery are housed in the hole.

11 Claims, 3 Drawing Sheets

(51) Int. Cl.
*G01M 13/04* (2006.01)
*G01M 17/10* (2006.01)

(56) References Cited

U.S. PATENT DOCUMENTS

| 6,259,372 | B1 * | 7/2001 | Taranowski et al. | 340/683 |
| 2008/0221486 | A1 * | 9/2008 | Brown | 600/595 |
| 2008/0255556 | A1 * | 10/2008 | Berger | 606/60 |

FOREIGN PATENT DOCUMENTS

| CN | 101465043 | 6/2009 |
| WO | WO 95/31053 A1 | 11/1995 |
| WO | WO 00/51869 A1 | 9/2000 |
| WO | WO 01/89903 A1 | 11/2001 |
| WO | WO 2009/047121 | 4/2009 |

OTHER PUBLICATIONS

International Search Report prepared by the European Patent Office on Jul. 1, 2011, for International Application No. PCT/IB2011/000624.

Written Opinion prepared by the European Patent Office on Jul. 1, 2011, for International Application No. PCT/IB2011/000624.

* cited by examiner

DEVICE FOR DIAGNOSING RAILWAY BOGIES BY APPLYING AN ENERGY-AUTONOMOUS MEASURING AND TRANSMITTING BOLT, AND CORRESPONDING CONTROL METHOD

CROSS REFERENCE TO RELATED APPLICATIONS

This application is a national stage application under 35 U.S.C. 371 of PCT Application No. PCT/IB2011/000624 having an international filing date of 23 Mar. 2011, which designated the United States, which PCT application claimed the benefit of Italian Application No. TO2010A000226 filed 23 Mar. 2010, the entire disclosure of each of which is incorporated herein by reference.

TECHNICAL FIELD

The present invention relates to a measuring and wireless-transmitting bolt for detecting and sending data on the dynamic stress of a mechanical device, such as for example a railway bogie, and to a railway bogie comprising said assembly. The present invention moreover relates to a data-processing logic for said wireless assembly.

BACKGROUND ART

Measurement of the stresses on a railway bogie is essential for monitoring the state of wear of the rolling stock and carrying out maintenance operations only when it is necessary. In fact, maintenance operations are costly and require stoppage times that reduce the profits linked to the use of the rolling stock. However, maintenance operations are of extreme importance for preventing failure or damage when the train is in use. Consequently, it is very important to apply reliable diagnostic methods for establishing the conditions of the rolling stock and programming maintenance operations in an efficient way such as to reduce the costs of management of the rolling stock itself.

In particular, carriages of a passenger train are electrified and it is thus possible to instrument the bogie with sensors and transmitters supplied by the line current. Instead, wagons of a freight train are not connected to the electrical supply, and the on-board diagnostic instrumentation requires installation of supply and data-transmission wiring starting from the locomotive and proceeding along the entire train. Said diagnostic system is clearly costly and also requires a complex maintenance since, in the case of malfunctioning and in particular of an interruption of the electrical contact, it is necessary to carry out testing on the wiring along the entire train.

In addition, railway trains, and in particular freight trains, are subject to severe standards, which restrict the possibilities of modifying the wagons. In particular, installation of measuring instrumentation on the bogie is normally not allowed without a rehomologation, which requires high costs of execution and long stoppage times.

From the production standpoint, the need is felt to provide a measuring bolt that can dimensionally replace current bolts present in an axle-box and having an internal structure suitable for reducing the production costs. At the same time, it is necessary to respect the stringent constraints of space imposed by the size of the bolts. In particular, it is necessary to identify an optimized position of each component in order to produce the energy sufficient for operation of the electronic and wireless-transmission devices mounted on the bolt.

DISCLOSURE OF INVENTION

The aim of the present invention is to provide a measuring and transmitting assembly for detecting dynamic and thermal stresses that will limit the drawbacks specified above and will be suited for being produced at reduced costs.

The aim of the present invention is achieved via a miniaturized measuring and transmitting assembly according to claim 1. In particular, a miniaturized wireless system with autonomous supply by means of recovery of the energy from vibrations is provided for monitoring railway bogies and corresponding components.

BRIEF DESCRIPTION OF THE DRAWINGS

For a better understanding of the present invention, a description thereof will be provided hereinafter with reference to the attached drawings, wherein.

BEST MODE FOR CARRYING OUT THE INVENTION

Figure 1:
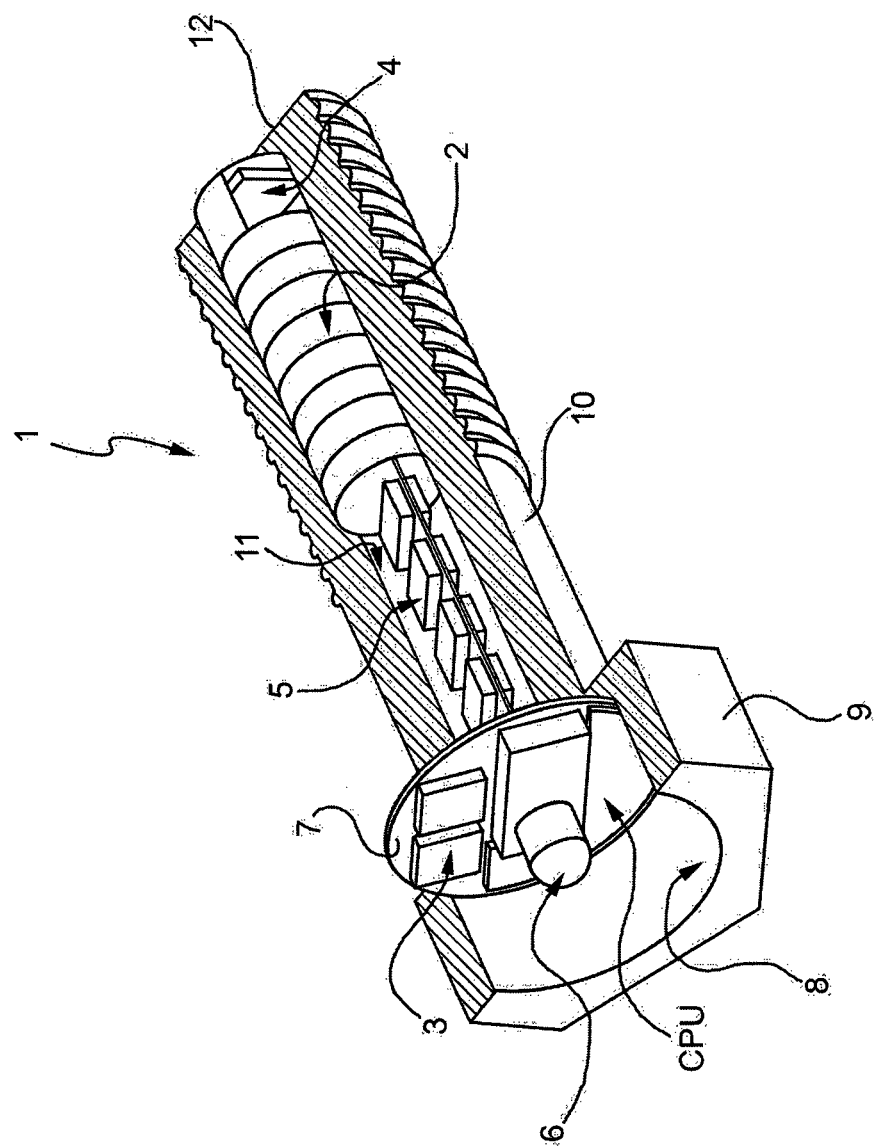
FIG. 1 is a perspective view with items removed for reasons of clarity of a measuring bolt according to the present invention.

In FIG. 1 designated as a whole by 1 is a bolt for detecting and transmitting data on dynamic stress, applied by way of non-limiting example to a railway bogie, in particular for a wagon for transporting freight.

The assembly 1 comprises an on-board central processing unit CPU, a rechargeable-battery pack 2, for example a rechargeable battery of the type normally available on the market, an inertial sensor 3, preferably of a MEMS type, a sensor for detecting a second physical quantity, such as, for example, a temperature sensor 4, at least one miniaturized mechanical-to-electrical energy converter 5 (the so-called "vibration scavenger" or "vibration harvester"), and a transmitter 6 comprising a programmable memory and provided with antenna. The CPU moreover integrates three electronic components, namely:

a rectifier device for converting the alternating current generated by the energy converter 5;

a device that stabilizes the voltage at output from the converter 5 at a constant nominal value. This is connected to the inertial sensor 3 and defines the level of constant voltage with respect to which the variations of voltage due to vibrations are detected; and a microchip device for processing the analog signals measured by the sensors 3 and 4 possibly integrated in a chip of the transmitter 6. Preferably, processing is performed at discrete threshold levels to be transmitted.

According to the present invention, the vibration sensor 3 is of a capacitive type and is miniaturized via the use of MEMS technologies, such as silicon micromachining techniques that comprise a step of photolithography and derive from machining on integrated circuits (bulk micromachining, surface micromachining, etc.). Advantageously, the vibration sensor 3 is constituted by a plurality of uniaxial devices, arranged along orthogonal axes so as to be able to detect the vibrations at least along two axes, preferably orthogonal to one another and contained in a plane perpendicular to that of the rails, i.e. along the axis Z (vertical direction) and along the axis Y (lateral direction). The signal-processing device will enable processing of the signals of the vibration sensor 3, thus supplying at output values to be transmitted by means of the device 6 after an initial processing. Thanks to the levels of precision and reliability up to now achieved by inertial sensors of a MEMS type, it is possible to install the inertial sensor 3 on a support 7 housed in a seat 8 defined by a head 9 of the bolt 1. In particular, the support 7 is substantially plane and is perpendicular to a threaded stem 10 of the bolt 1. In addition, mounted on the support 7 are also the transmitter 6 and the on-board central processing unit CPU. Advantageously, at least the on-board central processing unit CPU and the inertial sensor 3 are entirely housed also in an axial direction in the seat 8 within the head 9.

The energy converter 5 (illustrated only schematically in the figure) is preferably of the magneto-inductive type and is configured for converting kinetic energy into electrical energy and, in particular, for charging the battery pack 2. According to a preferred embodiment, the energy converter 5 comprises a mass-spring system, in which the mass comprises a permanent magnet. The magnetic field of the mass is concatenated with a plurality of turns, which convey an electric current if the mass is moving. In particular, the mass-spring system is sized for going into resonance in the frequency range normally detected when a railway wagon is travelling at the cruising speed.

According to the present invention, the energy converter 5 and the battery pack 2 are housed in a blind hole 11 of the stem 10. In addition, the energy converter 5 is firmly fixed to the stem so as to enable the most effective transmission of the vibrations. For example, the energy converter 5 is encapsulated in a casing and is fixed by interference fit to the stem 10 in the hole 11. Likewise, moreover, the support 7 is fixed via a polymeric resin, which, after it has hardened, transmits the mechanical vibrations from the bolt 8 to the MEMS inertial sensor 3 and can perform the action of filter for high-frequency vibrations. For example, the resin can be an epoxy-matrix resin.

Preferably, the bolt 1 is the bolt of an axle-box that radially supports the axle of the bogie of the freight wagon, and the temperature sensor 4 is set in the proximity of a bottom portion 12 of the stem 10 so as to be as close as possible to the axle-box bearing and detect the temperature thereof.

The bolt 1 forms part of a monitoring system comprising a local control unit mounted on the wagon and a main control unit mounted on the locomotive and provided with alarm and/or display devices for signaling anomalies to the driver. Each local control unit can be provided with an electrical-to-mechanical energy converter of its own that is more powerful than that of the bolt 1. Preferably, the bolt 1 and the respective local control unit, and the local control units and the main control unit communicate via wireless protocols, advantageously of the low-energy-consumption and short-range type, such as the IEEE 802.15.4 protocol or for example the 'ZigBee' (registered trademark) protocol developed by ZigBee Alliance.

In use, the bogie is subject to dynamic stresses of various nature, for example when going round bends and/or following upon heterogeneity of the stiffness of the railway embankment and/or as a result of wear of the rails and as a result of the dynamics of the vehicle due to the wheel-rail contact. The mechanical vibrations are converted into electrical energy for charging the battery 2 via the energy converter 5.

The battery 2 supplies both the inertial sensor 2 and the temperature sensor 4. The battery 2 moreover supplies the transmitter 6, which sends the data to the control unit mounted on the wagon and/or to that present in the locomotive.

According to the present invention, the on-board central processing unit CPU is programmed for energy saving. In particular, the on-board central processing unit is programmed so as to activate detection and transmission of the signal at least when the wagon is moving. Namely, no detection or transmission is performed when the wagon is stationary. There may be programmed measurement and stand-by cycles directly controlled by the voltage thresholds generated by the miniaturized converter 6. The converter 6 will enable turning-on and transmission of data if it generates an electric power higher than a pre-set level in such a way that said threshold is lower than the level of energy generated by a non-defective bogie at the cruising speed.

The on-board data-processing logic of the bolt 1 is characterized by programmable parameters such as cycle time, activation and turning-off times, and activation and measurement thresholds. In particular, the cycle time refers to a cycle of measurement of the level of vibrations and/or temperature. In this way, the measurement is not continuous but, rather, regulated via programming of the measurement cycle time. The activation threshold is, for example, programmed on the basis of the electric power generated by the converter (5). In particular, if the electric power generated is lower than the threshold, it is very likely that the bogie is being moved in a depot or for maintenance operations, and it is not necessary to carry out diagnostic measurements. The threshold is pre-set at a level beyond which the bogie is highly likely to be moving with a load on board. In this condition, clearly the diagnostics is useful and, in particular, at least one measurement cycle is activated.

Figure 2:
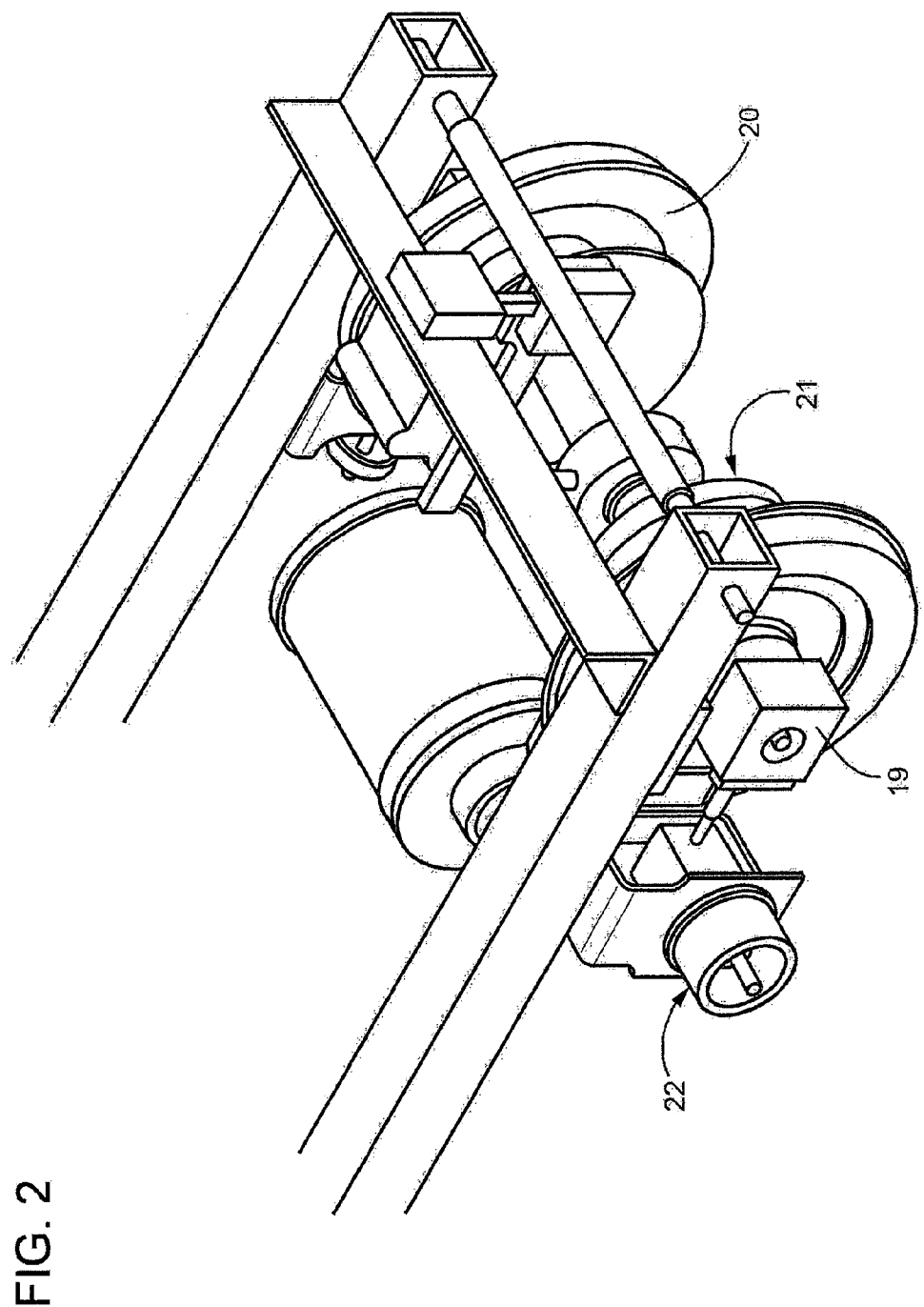
FIG. 2 is a schematic perspective view of railway bogie on which the measuring bolt is installed.
Figure 3:
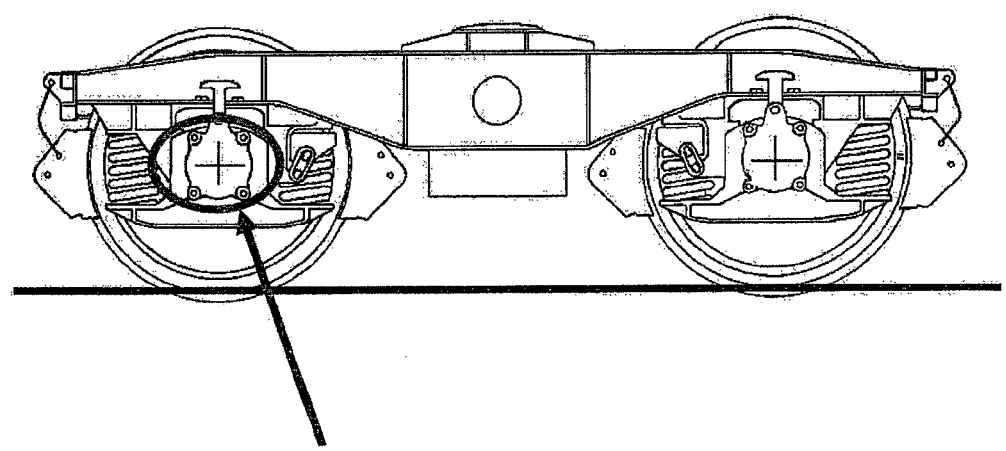
FIG. 3 is a detailed side view of the railway bogie of FIG. 2.

Preferably, with reference to FIG. 2, the bolt 1 can be used for fixing the bearings 19 of an axle 20 in such a way that the temperature sensor 4 is close to and preferably in contact with the axle-box of a bearing 19. In addition, the bolt 1 can be a bolt of a braking system 21 or else of a primary suspension 22 of the bogie. In railway vehicles, the primary suspensions enable mechanical connection of the railway axle with the frame of the bogie by means of elastic elements (springs) and possible damping elements (shock absorbers).

It is possible to provide a bolt 1 for each bearing 19, and each bolt 1 sends a corresponding unique identifier code in order for each bearing 19 to be associated in a biunique way to the data coming from the corresponding bolt 1.

The advantages that the bolt 1 according to the present invention affords are outlined in what follows.

Monitoring of a freight train can be executed in a reliable and precise way with zero energy consumption since all the energy required by the sensors 3, 4 is supplied by the energy converter 5. In this way, it is not necessary to require rehomologation of the wagon. In addition, the various components are arranged within the bolt 1 so as to enable more efficient exploitation of the space available. In particular, the energy converter 5 can have relatively large dimensions and thus it is set in the stem 10 together with the battery pack 2. In this way, it is also simpler to fix the converter to the stem and enable maximum transfer of energy coming from the vibrations.

Figure 4:
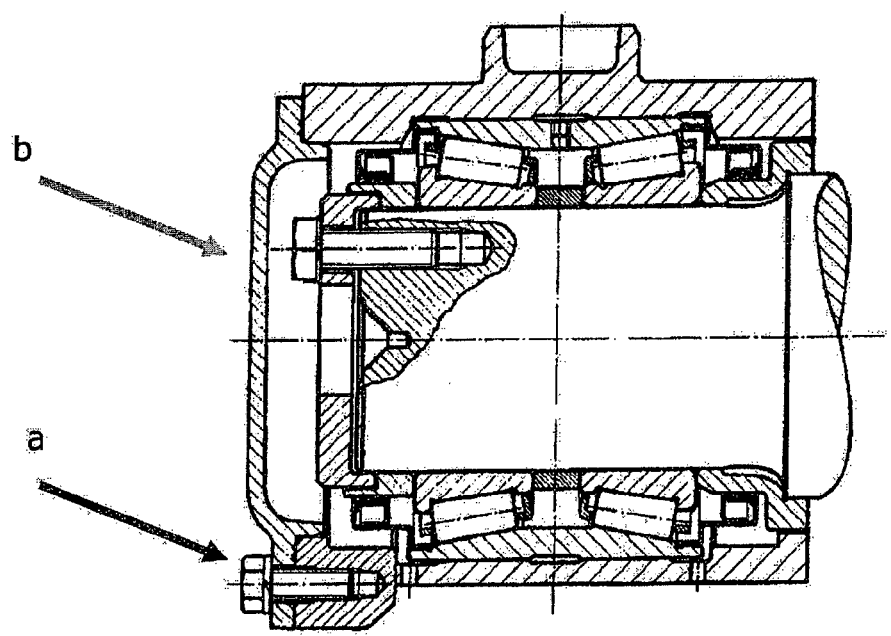
FIG. 4 is a cross section.

The bolt 1, which thus forms part of a diagnostic instrument for measuring and transmitting data on the railway bogie, may, for example, be directly used instead of the closing bolts on the axle-box cover (FIG. 4 detail 'a') or else instead of one of the (three) bolts for closing the axle-box bearing pack (FIG. 4 detail 'b'). A bolt for said uses is of a type normally comprised between M16 and M20. The programmability of an internal memory of the bolt in a wireless way, for example of the transmitter 6, will enable the diagnostic parameters of the system to be set. In particular, it should be emphasized that the measuring bolt can replace full bolts ranging between M16 and M20 for closing the axle-box cover and the axle-box bearings without it being necessary to re-adapt the threaded seat and/or to provide a dedicated threaded seat.

The MEMS sensor 3 is particularly compact and can be housed in the head 9 of the bolt 1. In addition, it is not necessary to apply instrumentation on the bogie, and the assembly can be entirely produced and tested in a remote way with respect to the workshop where maintenance of the bogie is performed. In addition, installation does not require specialized workforce for applying the dynamic-measurement instrumentation.

The temperature sensor 4 monitors a further parameter important for assessment of the wear of the components of a railway bogie, such as the supporting bearings of the axles or else the brake pads.

Detection of the RMS level of the vibrations and not the instantaneous value enables reduction of the operating energy required by the assembly 1.

The bolt 1 is programmable in wireless mode to prevent the need for dismantling to carry out reprogramming.

The control method based upon a measurement cycle instead of on a continuous measurement, and upon the fact that there exists a minimum threshold of electric power below which the sensors are not activated and do not transmit data, enables reduction of the dimensions of the battery pack 2 so as to render installation in the stem 10 simpler and so as to leave more space for installation of the miniaturized converter 5.

Finally, it is clear that modifications or variations may be made to the bolt 1 described and illustrated herein, without thereby departing from the sphere of protection as specified in the annexed claims.

The invention claimed is:

1. A measuring and transmitting bolt or threaded element for fixing components of a railway bogie, comprising: a head, defined in which is a seat and which is configured for being tightened via a tool; a threaded stem, defined in which is a hole; a vibration sensor; a transmitter; a battery for supplying said vibration sensor and transmitter; and a converter for converting into electrical energy the mechanical energy coming from the vibrations so as to recharge said battery, wherein said transmitter and said vibration sensor are attached to a fixed support which is housed in said seat defined in said head, wherein said mechanical-to-electrical energy converter and said battery are housed in said hole.

2. The bolt or threaded element according to claim 1, wherein said mechanical-to-electrical energy converter is fixed directly to said stem and converts into electrical energy the vibrations due to the motion of said railway bogie.

3. The bolt or threaded element according to claim 1, wherein said vibration sensor is connected to the transmitter, and in that said vibration sensor comprises a programmable central processing unit (CPU) for carrying out an initial processing of the data, comprising the step of comparing the power generated by said converter with a pre-set threshold value, and the step of activating a measurement cycle if said power is higher than said threshold.

4. The bolt or threaded element according to claim 3, wherein said transmitter comprises said central processing unit (CPU) and a memory and is programmable.

5. The bolt or threaded element according to claim 3, wherein said central processing unit (CPU) is programmable in a wireless mode.

6. The bolt or threaded element according to claim 1, wherein said bolt or threaded element comprises a temperature sensor set in said hole at an end portion of said stem.

7. The bolt or threaded element according to any claim 1, wherein at least one of said vibration sensor and said converter is a MEMS.

8. A railway bogie comprising a measuring and transmitting bolt or threaded element according to claim 1, said bolt being between M16 and M20 and being used for fixing an axle-box cover or else an axle-box bearing pack.

9. A railway wagon comprising a bogie according to claim 8, wherein said railway wagon comprises a local control unit configured for being connected via a wireless communication protocol to said bolt and for constituting a radio link with further control units of other wagons.

10. A railway wagon comprising a bolt or threaded element according to claim 1, characterized in that said railway wagon comprises a local control unit configured for being connected via a wireless communication protocol to said bolt (1) and for constituting a radio link with further control units of other wagons.

11. A method for processing data of a bolt or threaded element according to claim 1, wherein said method comprises the step of comparing the power generated by said converter with a pre-set threshold value, and the step of activating a measurement cycle if said power is higher than said threshold, a cycle time of said measurement cycle and said threshold being programmable.

\* \* \* \* \*

UNITED STATES PATENT AND TRADEMARK OFFICE
CERTIFICATE OF CORRECTION

| | |
|---|---|
| PATENT NO. | : 9,228,887 B2 |
| APPLICATION NO. | : 13/636314 |
| DATED | : January 5, 2016 |
| INVENTOR(S) | : Aurelio Soma and Giorgio De Pasquale |

It is certified that error appears in the above-identified patent and that said Letters Patent is hereby corrected as shown below:

Claims

Claim 7, Column 6, Line 23: Following "according to", DELETE "any"

Signed and Sealed this
Nineteenth Day of April, 2016

Michelle K. Lee
*Director of the United States Patent and Trademark Office*